Patented Oct. 22, 1935

2,017,866

UNITED STATES PATENT OFFICE 2,017,866

PROCESS FOR IMPROVING ROSIN

Avery A. Morton, Watertown, Mass., assignor, by mesne assignments, to Columbia Naval Stores Company of Delaware, Savannah, Ga., a corporation of Delaware No Drawing. Application May 3, 1930, Serial No. 449,695

8 Claims. (Cl. 87—2)

This invention relates to a process for improving rosin.

More particularly, it relates to a process by which commercial rosin can be made available for new uses and can be improved to eliminate disadvantages which at present attend its use in industry. It provides, furthermore, for the treatment of rosin to increase its molecular weight, to raise its melting point, and to effect a marked improvement in color, this latter by removing, changing, or avoiding the effect of compounds which tend to darken the rosin.

Commercial rosin is a substance of great industrial utility, especially because of its low cost and abundant sources of supply. Its chief uses are found in the manufacture of varnishes and synthetic resins, the making of soap, and the sizing of paper. But commercial rosin, whether it be gum, wood or other rosin, is a substance of a relatively low melting point. Also, it is characterized by an objectionable color, which is considered so both on its own account and because products made with it are prone to change in color more or less progressively with exposure to air and/or lapse of time.

These properties exclude rosin from certain fields for which it would otherwise be desirable and constitute serious limitations upon its availability for industrial uses. The low melting point is particularly objectionable in soap and in varnishes, where it limits the proportion of rosin that can be employed. More expensive substances have to be used, because with too much rosin the tendency to soften exceeds the permissible degree. It has been obvious that the doing of anything which would effect a substantial rise in the melting point of rosin would be highly beneficial.

To some extent, the undesirable effects of the low melting point of rosin can be overcome by the use of lime. In the so-called "limed rosin," there is a chemical union between lime and the acid of the rosin. However, this compound is only of limited value, for the reasons that "limed rosin" is not as readily soluble as rosin in the ordinary organic solvents and is not at all useful in soaps or sizes.

Abietic acid, which is a crystallized and purified form of rosin, has a melting point of 161– 165° C. but this high melting point does not appear when the crystals are melted and the abietic acid allowed to cool in the resinous state. The melting point of the resinous form is not higher than 85° C.

My invention provides for treating commercial rosin so as to effect a considerable rise of melting point; to increase the molecular weight by polymerization and/or self-condensation; and to decrease or avoid the color which is considered so objectionable.

I have found that rosin may be treated with sulfuric acid in such manner that a considerable increase in melting point results. The ultimate product makes a much harder soap than does ordinary rosin. It can be used in varnishes and when so used gives more body to the mixture. It has less tendency to crystallize when thinners are added; and it makes a harder and more durable film. Similar advantages are found when it is employed in synthetic resins.

In the practice of my invention, it is wise to observe suitable precautions in order that crystallization of the abietic acid of the rosin may be avoided. Likewise, excessive decomposition of the rosin should be guarded against. Within these limitations, the treatment of the rosin according to the present invention may be varied over a wide range. The following constitutes an illustrative example of one way of practicing the invention.

A preferred method calls for the use of 800 grams of rosin, the same being dissolved in 525 cc. of gasolene. To this mixture is added a solution of sulfuric acid consisting approximately of 340 cc. of commercial concentrated acid (approximately 1.84 specific gravity) and 136 cc. of water. The addition of the acid should be accompanied by constant stirring, cooling being employed to keep the mixture between 30 and 32° C. The rate of addition of acid may advisably be such that it is completed within a half hour. Notwithstanding the characteristic immiscibility of the acid and the gasolene, the mass thus produced acquires a thick homogeneous aspect, whose stirring is continued for one and one half hours longer, at the end of which time the mixture is stirred into 2000 cc. of gasolene.

Following the addition to gasolene in the manner above mentioned, the mixture separates into a gasolene layer and an acid layer. The gasolene layer is washed with water to free it from any free or combined sulfuric acid and is then distilled to recover the gasolene. The rosin remains behind in the still, and, with proper precautions, should be of very light color. I have found that commercially best results are obtainable with an aluminum still. To obtain the best color it is desirable to use a gasolene which has been previously used in the process and recovered, as by so doing all color making bodies in the gasolene will have been removed. By experiment I have found that under these conditions the melting point may be increased as much as 65° C. and the molecular weight raised to 785, from the neighborhood of 340. Although the rosin has been in contact with sulfuric acid, there is less than one per cent of sulfur in the product.

Frequently, a curd-like portion forms during the washing of the gasolene layer with water, this curd-like portion amounting to as much as 10 per cent. It may be treated separately with gasolene and water, giving a light colored rosin very similar to the rest. A certain amount of an acid sludge is also formed. If the reaction mix is treated with gasolene immediately after the conclusion of a run, the quantity of rosin in this sludge will not be above 3 or 4 per cent of the original rosin. It may be decomposed separately with water and gasolene and a substantial amount of rosin recovered from it. Some rosin also remains in the sulphuric acid layer and can be recovered by the addition of water and gasolene. Or this sulphuric acid layer can be used directly in another run.

Instead of distilling off the gasolene, as above suggested, it is possible also, after washing out the sulfuric acid, to extract with sodium hydroxide solution, and then, by steam distilling the alkaline layer, to remove the residual gasolene. The improved rosin may then be obtained, by a process of precipitation, as the sodium compound. As an example, it may be salted out with common salt or excess alkali. In the form of the sodium compound, the product is suitable for use in soap or size.

In another illustration of the process, 100 grams of rosin were treated, and 100 cc. of gasolene, 20 cc. of commercially concentrated sulfuric acid, and 25 cc. of water were employed. The mixture was refluxed and stirred for five hours at a temperature of about 55° C. An increase in the melting point of 55° C. resulted by this treatment. The molecular weight of the rosin thus obtained I found to be 1550, as against an average molecular weight of commercial rosin of 340.

In another example, 100 grams of rosin were used with 75 cc. of gasolene, 62½ cc. of commercially concentrated sulfuric acid, and 25 cc. of water. At a temperature of 31° C., the mass was stirred for one and one half hours. At the end of that time, it was found that the melting point had been increased 63° C. and the molecular weight increased to 750. These results compare favorably with those obtained by treating 800 grams of rosin, dissolved in 525 cc. of gasolene, with 340 cc. of concentrated acid in 136 cc. of water, where, as above stated, a melting point increase of 65° C. was obtained and the molecular weight was raised to 785.

The proportions and procedures above specified have been found successful with gum rosin of the grade known commercially as "WG." With the much darker grade of rosin known as "G", comparable results have been obtained. It is therefore believed probable that the discover is applicable to rosins generally, suitable variations of time, quantity of acid, etc., being employed.

It is advisable to use a concentrated solution of rosin in gasolene in order to hasten the reaction. With the more dilute solutions, the rosin may crystallize, the crystals probably being abietic acid. The product referred to herein is distinguished from abietic acid by having a higher melting point, a much greater molecular weight, and greater solubility in varnish thinners.

Abietic acid is here referred to in its resinous state, and is taken for comparison as the purest form of rosin. With continuance of the reaction herein described the melting point and the molecular weight of the mass to be recovered as the end product increase, and the iodine value decreases. Considerations of acid value and of unsaponifiable matter in this mass are not significant, as these changes result from side reactions which preferably are to be avoided as much as is feasible.

Considering the finished product it is understood that any mass of it which may be taken for test contains rosin which is polymerized, the proportion of the whole mass depending on the time of continuance of the reaction and upon other conditions, and contains other rosin which is not yet polymerized. Hence differences may be observed between different specimens of the product, as to melting point and as to molecular weight in benzene, depending on the extent to which polymerization has proceeded in the particular samples in hand, these values always being above the highest for rosin,—that is, for pure rosin, abietic acid in the resinous state,—yet not up to the theoretical melting point of a completely polymerized rosin mass. The conditions which I have described do not make the latter, nor have I obtained it by mere prolonging the reaction, because when carried too for other reactions come in, so that the yield does not continue to increase. The progressive character of the reaction is seen by comparing the illustrative examples given above, which for longer periods of reaction show higher molecular weights.

Wide variations may be introduced in the practice of my invention, thus, higher temperatures may be used with a reduction in the concentration of the acid employed. Conversely, lower temperatures and slightly more concentrated acid may be used. A longer time and a weaker solution of acid may also be employed. Instead of following the procedure above outlined, the rosin solution may well be poured into the sulphuric acid, a procedure which helps avoid crystallization.

The rate of the reaction is dependent to a considerable extent on the nature of the stirrer, the shape of the vessel and the velocity of agitation. The time necessary to carry out the process thoroughly can readily be determined for any apparatus by making an initial run in which the samples are taken out at regular intervals and analyzed. In general, in establishing optimum conditions, it is necessary to follow the process closely, taking such samples from time to time.

In general, solvents which react with the polymerizing agent should be avoided.

The chemical changes which occur are probably the results of a number of reactions. Such reactions as polymerization, condensation, oxidation are possible and probably occur. There is some reduction in the acidity of the rosin, amounting to perhaps 10 to 20 per cent. There is an improvement in color, resulting from oxidation of color bodies; from hydrolysis of the peroxide acids of the rosin, which in themselves are dark colored; or from the polymerization itself.

The improvement in color to which mention has been made above is not only in the color of the rosin itself, but also in the color and permanence of color of the product in which the rosin is used.

The process may be varied within wide limits without departing from the inventive thought.

The examples given above are illustrative only and are not intended as a restriction to the particular disclosure which has been made. It is intended that the patent shall cover, by suitable expression in the appended claims, whatever features of patentable novelty reside in the invention.

The change of rosin from solid to liquid form, commonly called "melting", occurs gradually through a range of several degrees of rising temperature. While there is no sharp point at which the melting occurs, the limits of this range are fairly definite for any particular rosin. Therefore as a definite figure is ascertainable, by either of several various methods, it is convenient and is customary, in the trade and in literature, to speak of the melting "point" of rosin. In this specification the expression "melting point", as applied to rosin, signifies the mean temperature of the melting, being midway between that at which a beginning of softening of the rosin is observed and that at which the rosin is seen to be liquid, when these two points are determined by the capillary tube method commonly used in laboratories. The various other methods for determining melting point all give higher figures than are obtained by the capillary tube method. Some of the older determinations of melting point are not now considered reliable; and it has been said that variation may be found between the melting points of different samples. The figures given in the examples set out in this specification refer to the particular samples which happened to be used in certain of my experiments, selected as being typical; but I have discovered, and verified by a huge number of experiments, that the invention is applicable to produce the above stated improvements by converting any particular ordinary rosin, whatever may be the origin, variety or grade, and by whatever method its melting point is determined.

The range of temperatures over which the reaction may be carried out is dependent to a considerable extent on factors such as the concentration of the rosin in the gasoline, the strength and quantity of sulfuric acid, and the viscosity of the mixture. In general it would not be advantageous to operate above 70° C. because of the oxidizing action of the acid on the rosin. At temperatures below 0° C. the mixture becomes very viscous unless an excessive amount of solvent is used. An advantage of working at the lowest practical temperatures is that the unsaponifiable content is usually lower under such conditions.

I claim as my invention:

1. A process for changing the characteristics of rosin, which comprises dissolving the rosin in gasolene at a mutual concentration of the order of equal parts of gasolene and of rosin; adding slowly a solution, of sulfuric acid in water, of somewhat less than "commercially concentrated" strength, meanwhile agitating and cooling the mixture to maintain a temperature of the order of 31° C.; continuing this agitation and cooling for a period sufficient to promote reaction while minimizing crystallization; thereafter separating the mix into gasolene and acid portions, and, by distillation of the gasolene, recovering rosin, free or combined, which has color improved over that of the rosin with which the process began, and which when in resinous state has its melting point increased to above the melting point of pure abietic acid in resinous state and also to above 85° C. as determined by the capillary tube method.

2. A process for changing the characteristics of rosin, which comprises dissolving rosin in gasolene at a mutual concentration approximating 800 grams of rosin to 525 cc. of gasolene; adding slowly a solution of sulfuric acid having strength and volume in the proportion of 340 cc. of commercially concentrated acid plus 136 cc. of water, meanwhile agitating and cooling, and maintaining the temperature of the mixture of the order of 31° C.; continuing the stirring to a total approximating two hours; then adding gasolene in volume approximating four times the original volume of gasolene; separating the mixture into a gasolene layer and an acid layer; washing the contents of the gasolene layer for removing free and combined sulfuric acid; and then separating from the washed liquid a free or combined rosin in which the rosin has a melting point higher than that of the original rosin.

3. A process for increasing the melting point of rosin over that of pure abietic acid when in the resinous state, which comprises dissolving the rosin in a quantity of gasolene whose weight is less than that of the rosin dissolved therein; adding strong sulfuric acid, which however has its strength somewhat less than that of commercially concentrated sulfuric acid; the commercially concentrated equivalent of that sulfuric acid which is actually present being of a volume which is less in number of cubic centimeters than the number of grams of rosin present; agitating together for a period sufficient to promote reaction while minimizing crystallization; and by suitable steps recovering the rosin.

4. A process for improving rosin, which comprises the agitating of rosin with strong sulfuric acid which has its strength somewhat less than that of commercial concentrated sulfuric acid, while the rosin is in solution in a solvent, as gasolene, to which the sulfuric acid is inert; the said agitation being continued for a considerable period of time until by reaction, the rosin within the solvent becomes converted to a different substance which when solid is resinous and has its melting point above 85° C. as determined by the capillary tube method; adding gasolene, thereby increasing the fluidity of the mass and diluting the solution of the reaction product; and thereafter separating the sulfuric acid from the rosin solution, and separating the improved rosin from its said solvent; the said reaction being further identified by the fact that when it is carried out within a temperature range of 30° to 55° C. the temperature conditions are favorable for effecting the said converting.

5. A process for increasing the melting point of rosin over that of pure abietic acid in the resinous state, which process comprises the treating of the rosin while concentrated by being dissolved in a quantity of gasolene having weight less than that of the rosin, with a sulfuric acid solution of at least 81% concentration; these solutions, in the state of a thick homogeneous mass, with the rosin in solution in the gasolene, being agitated together to promote reaction with the sulfuric acid and to minimize crystallization; and then gasolene containing the rosin product being separated from the acid; and the rosin product being then recovered from the gasolene by suitable steps.

6. A process for increasing the melting point of rosin comprising the converting of ordinary rosin into a rosin product which when solid is resinous and has a melting point above the meltous state, which process comprises dissolving the rosin in gasolene; adding sulfuric acid; agitating; and recovering the rosin product; the relative quantities to be taken of rosin, gasolene, and sulfuric acid being such that, at the temperature which the mixture has during the adding of sulfuric acid and the agitating, the rosin and its product remain in solution in the gasolene, with reaction of the acid upon the rosin producing the said coverting, and the said temperature being of the order of 31° C.

7. As a new composition, a resinous derivative of rosin, having properties of the general nature of those of rosin, but with the difference that it has a molecular weight within the range of 5% to 400% greater than that of ordinary rosin in its pure state; and is further characterized, in differentiation from rosin, by having its melting point, as determined by the capillary tube method, above 85° C., and higher than the melting point of pure abietic acid when in the resinous state, and higher than the melting point of purified rosin when in the resinous state; said derived composition being substantially free from combined sulfur, and being further characterized by being devoid of hardening substances held in combination, and by having an iodine value lower than that of pure abietic acid, and by having a molecular weight higher than that of pure abietic acid.

8. As a new composition, a resinous derivative of rosin, having properties of the general nature of those of rosin, but with the difference that it has a molecular weight within the range of 5% to 400% greater than that of ordinary rosin in its pure state; and is further characterized, in differentiation from rosin, by having its melting point, as determined by the capillary tube method, above 85° C., and higher than the melting point of pure abietic acid when in the resinous state, and higher than the melting point of purified rosin when in the resinous state; said derived composition being further characterized by being free from added non-resinous material in combination, except that a small residue of sulfur may be present, and by having an iodine value lower than that of pure abietic acid, and by having a molecular weight higher than that of pure abietic acid.

AVERY A. MORTON.